(12) United States Patent
Wai et al.

(10) Patent No.: US 7,128,840 B2
(45) Date of Patent: Oct. 31, 2006

(54) ULTRASOUND ENHANCED PROCESS FOR EXTRACTING METAL SPECIES IN SUPERCRITICAL FLUIDS

(75) Inventors: Chien M. Wai, Moscow, ID (US); Youichi Enokida, Nagoya (JP)

(73) Assignee: Idaho Research Foundation, Inc., Moscow, ID (US)

( * ) Notice: Subject to any disclaimer, the term of this patent is extended or adjusted under 35 U.S.C. 154(b) by 550 days.

(21) Appl. No.: 10/397,862

(22) Filed: Mar. 25, 2003

(65) Prior Publication Data

US 2003/0183043 A1   Oct. 2, 2003

Related U.S. Application Data

(60) Provisional application No. 60/368,029, filed on Mar. 26, 2002.

(51) Int. Cl.
  *B01D 11/02* (2006.01)
  *B01J 8/00* (2006.01)
  *B01J 19/00* (2006.01)

(52) U.S. Cl. .................. 210/634; 210/511; 210/638; 210/912; 23/293 R; 75/743; 75/744; 204/157.42; 423/1; 423/111; 423/21.1; 423/23; 423/138; 423/99; 423/87; 423/3; 423/22

(58) Field of Classification Search ............. 23/293 R; 75/743, 744; 210/912, 634, 511, 638; 423/1, 423/111, 21.1, 23, 138, 99, 87, 3, 22; 204/157.42
See application file for complete search history.

(56) References Cited

U.S. PATENT DOCUMENTS

| | | | |
|---|---|---|---|
| 3,882,018 A | 5/1975 | Depree | |
| 3,975,416 A | 8/1976 | Mazdiyasni et al. | |
| 4,015,980 A | 4/1977 | MacKay et al. | |
| 4,051,223 A | 9/1977 | MacKay | |
| 4,065,502 A | 12/1977 | MacKay et al. | |
| 4,069,273 A | 1/1978 | Komoto | |
| 4,128,493 A | 12/1978 | MacKay et al. | |
| 4,206,132 A | 6/1980 | Sievers | |
| 4,275,039 A | 6/1981 | Özensoy et al. | |
| 4,457,812 A | 7/1984 | Rado | |
| 4,464,251 A | 8/1984 | Kukes et al. | |
| 4,465,587 A | 8/1984 | Garg et al. | |
| 4,475,993 A | 10/1984 | Blander et al. | |
| 4,518,484 A | 5/1985 | Mann et al. | |
| 4,528,100 A | 7/1985 | Zarchy | |
| 4,529,503 A | 7/1985 | Kukes | |
| 4,547,292 A | 10/1985 | Zarchy | |

(Continued)

FOREIGN PATENT DOCUMENTS

CA   2107111   9/1992

(Continued)

OTHER PUBLICATIONS

Brunner et al., "Zum Stand der extraktion mit komprimierten Gasen," *Chem.-Ing.-Tech.*, 53:529-542. (No English Translation).

(Continued)

*Primary Examiner*—Timothy C. Vanoy
(74) *Attorney, Agent, or Firm*—Klarquist Sparkman, LLP

(57) ABSTRACT

Improved methods for the extraction or dissolution of metals, metalloids or their oxides, especially lanthanides, actinides, uranium or their oxides, into supercritical solvents containing an extractant are disclosed. The disclosed embodiments specifically include enhancing the extraction or dissolution efficiency with ultrasound. The present methods allow the direct, efficient dissolution of $UO_2$ or other uranium oxides without generating any waste stream or by-products.

39 Claims, 6 Drawing Sheets

U.S. PATENT DOCUMENTS

| | | | |
|---|---|---|---|
| 4,563,213 A | 1/1986 | Hubred | |
| 4,609,043 A | 9/1986 | Cullick | |
| 4,867,951 A | 9/1989 | Smith et al. | |
| 4,877,530 A | 10/1989 | Moses | |
| 4,895,905 A | 1/1990 | Schneider et al. | |
| 4,898,673 A | 2/1990 | Rice et al. | |
| 4,908,135 A | 3/1990 | Brisdon et al. | |
| 4,909,868 A | 3/1990 | Melvin | |
| 4,911,941 A | 3/1990 | Katz et al. | |
| 4,916,108 A | 4/1990 | McLaughlin et al. | |
| 4,923,630 A | 5/1990 | Smith et al. | |
| 4,935,498 A | 6/1990 | Sessler et al. | |
| 4,942,149 A | 7/1990 | Shinbo et al. | |
| 4,964,995 A | 10/1990 | Chum et al. | |
| 4,970,093 A | 11/1990 | Sievers et al. | |
| 5,006,254 A | 4/1991 | Cailly et al. | |
| 5,013,443 A * | 5/1991 | Higashidate et al. | 554/184 |
| 5,045,220 A | 9/1991 | Harris et al. | |
| 5,087,370 A | 2/1992 | Schultheis et al. | |
| 5,135,567 A | 8/1992 | Volotinen et al. | |
| 5,169,968 A | 12/1992 | Rice | |
| 5,194,582 A | 3/1993 | Eldridge et al. | |
| 5,225,173 A | 7/1993 | Wai | |
| 5,274,129 A | 12/1993 | Natale et al. | |
| 5,332,531 A | 7/1994 | Horwitz et al. | |
| 5,356,538 A | 10/1994 | Wai et al. | |
| 5,538,701 A * | 7/1996 | Avens et al. | 423/3 |
| 5,606,724 A | 2/1997 | Wai et al. | |
| 5,639,441 A | 6/1997 | Sievers et al. | |
| 5,641,887 A | 6/1997 | Beckman et al. | |
| 5,730,874 A | 3/1998 | Wai et al. | |
| 5,750,081 A | 5/1998 | Smart | |
| 5,770,085 A | 6/1998 | Wai et al. | |
| 5,788,844 A | 8/1998 | Olafson | |
| 5,789,027 A | 8/1998 | Watkins et al. | |
| 5,792,357 A | 8/1998 | Wai et al. | |
| 5,840,193 A | 11/1998 | Smart et al. | |
| 5,868,856 A | 2/1999 | Douglas et al. | |
| 5,965,025 A | 10/1999 | Wai et al. | |
| 6,075,130 A | 6/2000 | Chen et al. | |
| 6,113,795 A * | 9/2000 | Subramaniam et al. | 210/651 |
| 6,117,413 A | 9/2000 | Fisher et al. | |
| 6,132,491 A | 10/2000 | Wai et al. | |
| 6,187,911 B1 | 2/2001 | Wai et al. | |
| 6,524,628 B1 | 2/2003 | Wai et al. | |
| 6,653,236 B1 | 11/2003 | Wai et al. | |
| 6,656,436 B1 * | 12/2003 | Sentagnes et al. | 422/186 |
| 2003/0108463 A1 * | 6/2003 | Small | 423/138 |
| 2005/0207954 A1 * | 9/2005 | Tanaka et al. | 423/138 |

FOREIGN PATENT DOCUMENTS

| | | |
|---|---|---|
| CA | 2145054 | 9/1995 |
| JP | 52009623 | 1/1977 |
| JP | 55147104 | 11/1980 |
| JP | 59020406 | 2/1984 |
| JP | 61225139 | 6/1986 |
| WO | WO 91/04945 | 4/1991 |
| WO | WO 92/10263 | 6/1992 |
| WO | WO 95/28999 | 2/1995 |
| WO | WO 95/33541 | 12/1995 |
| WO | WO 95/33542 | 12/1995 |
| WO | WO 97/16575 | 2/1997 |
| WO | WO 98/04753 | 2/1998 |
| WO | WO 98/04754 | 2/1998 |
| WO | WO 99/09223 | 2/1999 |

OTHER PUBLICATIONS

Burford et al., "Comparison of methods to prevent restrictor plugging during off-line supercritical extraction," *J. Chromatogr.*, 609:321-332 (1992).

Burford et al., "Construction of a robust stainless-steel clad fused-silica restrictor for use in supercritical fluid extraction," *J. Chromatogr.*, 648:445-449 (1993).

Cal et al., "In Situ Derivatization and Supercritical Fluid Extraction for the Simultaneous Determination of Butyltin and Phenyltin Compounds in Sediment," *Anal. Chem.*, 66:1161-1167 (1994).

Carrott et al., "High solubility of $UO_2(NO_3)_2$ 2TBP complex in supercritical $CO_2$," *Chem. Commun.*, pp. 373-374 (1998).

Consani et al., "Observations on the Solubility of Surfactants and Related Molecules in Carbon Dioxide at 50° C.," *The Journal of Supercritical Fluids*, 3:51-65 (1990).

Ehmann et al., "Radiotracer Methods," *Radiochemistry and Nuclear Methods of Analysis*, J. Wiley & Sons, Inc., New York, pp. 313-336 (1991).

Elliott et al., "Tri-*n*-Octylphosphine Sulfide: A Selective Organic Extractant," *Anal. Chim. Acta.*, 33:237-244 (1965).

Enokida et al., "Ultrasound-Enhanced Dissolution of $UO_2$ in Supercritical $CO_2$ Containing a $CO_2$-Philic Complexant of Tri-n-butylphosphate and Nitric Acid," *Ind. Eng. Chem. Res.*, 41:2282-2286 (2002).

Fujimoto et al., "The Use of Polar Modifiers in Microbore Supercritical Fluid Chromatography Combined with Inductively Coupled Plasma Spectrometry," *J. Microcolumn Separations*, 1:19-22 (1989).

Laintz et al., "Extraction of Lanthanides from Acidic Solution Using Tributyl Phosphate Modified Supercritical Carbon Dioxide," *Anal. Chem.*, 66:2190-2193 (1994).

Laintz et al., "Extraction of Metal Ions from Liquid and Solid Materials by Supercritical Carbon Dioxide," *Anal. Chem.*, 64:2875-2878 (1992).

Langenfeld et al., "Effects of collection solvent parameters and extraction cell geometry on supercritical fluid extraction efficiencies," *J. Chromatogr.*, 594:297-307 (1992).

Lin et al., "Supercritical Fluid Extraction of Lanthanides and Actinides from Solid Materials with a Fluorinated β-Diketone," *Anal. Chem.*, 65:2549-2551 (1993).

Lin et al., "Supercritical Fluid Extraction of Thorium and Uranium Ions from Solid and Liquid Materials with Fluorinated β-Diketones and Tributyl Phosphate," *Environ. Sci. Technol.*, 28:1190-1193 (1994).

Lin et al., "Supercritical Fluid Extraction of Lanthanides with Fluorinated β-Diketones and Tributyl Phosphate," *Anal. Chem.*, 66:1971-1975 (1994).

Lin et al., "Supercritical fluid extraction and chromatography of metal chelates and organometallic compounds," *Trends in Analytical Chemistry*, 14:123-133 (1995).

Liu et al., "Determination of Organotin Compounds in Environmental Samples by Supercritical Fluid Extraction and Gas Chromatography with Atomic Emission Detection," *J. High Resolution Chromatogr.*, 16:106-112 (1993).

Liu et al., "Determination of Metals in Solid Samples by Complexation-Supercritical Fluid Extraction and Gas Chromatography-Atomic Emission Detection," *J. Chromatogr. Sci.*, 31:310-316 (1993).

Lo et al., "Solvent Extraction of Dithiocarbamate Complexes and Back-Extraction with Mercury(II) for Determination of Trace Metals in Seawater by Atomic Absorption Spectrometry," *Anal. Chem.*, 54:2536-2539 (1982).

Minczewski et al., "Liquid-Liquid Extraction," *Separation and Preconcentration Methods in Inorganic Trace Analysis Halsted Press*, New York 97-282 (1982).

Neeb, "Metal-Chelate Gas-Chromatography for Trace Element Analysis," *Pure & Appl. Chem.*, 54:847-852 (1982).

Oudsema et al., Determination of an Organotin Stabilizer in a Rigid Poly(Vinyl Chloride) Plastic by On-Line Supercritical Fluid Extraction and Chromatography with Formic Acid Modified Carbon Dioxide and Flame Ionization Detection, *J. High Resolution Chromatogr.*, 16:198-202 (1993).

Smart et al., "Extraction of Toxic Heavy Metals Using Supercritical Fluid Carbon Dioxide Containing Organophosphorus Reagents," *Ind. Eng. Chem. Res.*, 36:1819-1826 (1997).

Sole et al., "Solvent extraction of copper by Cyanex 272, Cyanex 302 and Cyanex 301," *Hydrometallurgy*, 37:129-147 (1995).

Tait, "Cobalt-nickel separation: the extraction of cobalt (II) and nickel (II) by Cyanex 301, Cyanex 302 and Cyanex 272," *Hydrometallurgy*, 32:365-372 (1993).

Tait, "The Extraction of Some Base Metal Ions by Cyanex 301, Cyanex 302, and their Binary Extractant Mixtures with Aliquat 336," *Solv. Extr. Ion Exch.*, 10:799-809 (1992).

Tang et al., "Enhanced Extraction of Lanthanides with Crown Ether Carboxylic Acids of Increasing Lipophilicity," *Analyst*, 114:451-453 (1989).

Tang et al., "Solvent Extraction of Lanthanides with a Crown Ether Carboxylic Acid," *Anal. Chem.*, 58:3233-3235 (1986).

Tomioka et al., "New Method for the Removal of Uranium from Solid Wastes with Supercritical $CO_2$ Medium Containing $HNO_3$-TBP Complex," *J. Nuc. Sci. & Tech.*, 38:461-62 (2001).

Wai et al., "Supercritical Fluid Extraction of Organic and Inorganic Mercury from Solid Materials," *Talanta*, 40:1325-1330 (1993).

Wang et al., "Recovery of Metals from Aqueous Media by Extraction with Supercritical Carbon Dioxide," *Anal. Chem.*, 66:1658-1663 (1994).

Wang et al., "Selective Extraction of Mercury with Ionizable Crown Ethers in Supercritical Carbon Dioxide," *Anal. Chem.*, 67:919-923 (1995).

Wilke, "Extraktion mit überkritischen Gasen—ein Vorwort," *Angew. Chem.*, 10:747-832 (1978). (No English Translation).

Worthy, "Supercritical fluids offer improved Separations," *C&EN*, 59:16 (1981).

Zhu et al., "The Extraction of Americium and Light Lanthanides by HDEHDTP and Cyanex 302," *Radio Acta.*, 69:191-193 (1995), Zhu et al., "The Separation of Americium from Light Lanthanides by Cyanex 301 Extraction," *Radio. Acta.*, 68:95-98 (1995).

* cited by examiner

*Enhanced dissolution of uranium oxides*

ULTRASOUND ENHANCED PROCESS FOR EXTRACTING METAL SPECIES IN SUPERCRITICAL FLUIDS

CROSS-REFERENCE TO RELATED APPLICATION

This application claims the benefit of the earlier filing date of U.S. provisional patent application No. 60/368,029, filed on Mar. 26, 2002. Applicants' prior application is incorporated herein by reference.

STATEMENT OF GOVERNMENT SUPPORT

This invention was funded in part by the Department of Energy Office of Environmental Management, DE-FG07-98ER14913. The United States Government may have certain rights in this invention.

FIELD

The present disclosure concerns extracting metals and/or metalloids from a material, such as a solid or liquid, particularly using supercritical fluid extraction.

BACKGROUND

Metals typically are extracted from raw materials, such as metal oxides, and thereafter separated from other materials either used for or generated by the extraction process. Solvent extraction at atmospheric pressure following dissolution of solids with an acid is a widely used technique for extracting metals and metal oxides from solid materials. However, conventional acid dissolution followed by solvent extraction processes requires large amounts of solvents and acids. Those same solvents and acids often become waste, and waste treatment and disposal presents an important environmental problem, particularly for radioactive solid wastes. Removing radioactive materials and metal contaminants from wastes generated by mines and nuclear plants would facilitate safer and cheaper disposal of the remaining waste products. Current methods for decontaminating such wastes are infeasible on an industrial scale because of the large quantity of secondary acid and solvent waste generated by such methods.

Recently, supercritical fluids comprising a chelating agent have been proposed for chelation and dissolution of metals and metal oxides without the use of either organic solvents or aqueous solutions. Various features of supercritical fluid extraction of metals and metalloids are disclosed in Dr. Chien Wai et al.'s U.S. Pat. Nos. 5,356,538, 5,606,724, 5,730,874, 5,770,085, 5,792,357, 5,965,025, 5,840,193, 6,132,491 and 6,187,911 ("Wai's patents"). Wai's patents are incorporated herein by reference. Wai's patents disclose various features for extracting metalloid and metal ions from materials by exposing the materials to a fluid solvent, particularly supercritical carbon dioxide, containing a chelating agent.

Despite these prior known processes, there are still some disadvantages associated with these and other more traditional purification processes for metals, such as uranium. These disadvantages include: (a) low yields of purified metals and low overall efficiency; (b) time consuming steps; (c) the creation of undesirable waste streams; and (d) slow extraction rates.

A need therefore exists for an environmentally safe method for separating and/or purifying metals from other metals, metalloids and/or impurities. A further need exists for a method which is both efficient and provides for a greater yield of the extracted and purified metals.

SUMMARY OF THE DISCLOSURE

Disclosed embodiments of the present method are useful for extracting metals and metalloids, especially lanthanides, actinides, transition metals, platinum group metals, and their oxides, from a solid or a liquid by exposing the solid or liquid to an acid extractant composition, such as an aqueous acid extractant composition particularly forming emulsions or microemulsions, in a supercritical fluid solvent. Aqueous acid emulsions alone are effective for extracting metals and metalloids into supercritical carbon dioxide ("SF-$CO_2$"). This likely is because the specific surface area per unit volume of the emulsion is quite large. Forming a complex, especially an aqueous complex, of an acid with a chelating agent for use as the extractant was particularly effective. The acid and chelating agent are typically a Lewis acid and a Lewis base, respectively.

Moreover, using ultrasound in combination with an extractant substantially enhances the rate and the efficiency of the extraction process. This is likely true for at least two reasons: (1) ultrasound maintains the emulsion or microemulsion, i.e., it reduces the rate at which the droplets of the emulsion coalesce, and (2) the ultrasound facilitates mass transport, i.e., it helps move the solubilized metal or metalloid species into the supercritical fluid phase, away from the liquid or solid phase surface.

Disclosed embodiments of the present method are particularly useful for dissolving or extracting uranium dioxide-containing materials in SF-$CO_2$. As such, they may be particularly suited to reprocessing spent nuclear fuels and for treating certain nuclear wastes. Indeed, the disclosed method for ultrasound-aided SF-$CO_2$ dissolution has important applications for recovering uranium from $UO_2$ trapped in narrow spaces, such as in natural soil, sintered materials, and locally rough surfaces. Moreover, disclosed embodiments of the present method may be used to recover platinum, palladium and other metals from waste materials, such as used catalytic converters.

DETAILED DESCRIPTION OF SEVERAL EMBODIMENTS

Figure 1:
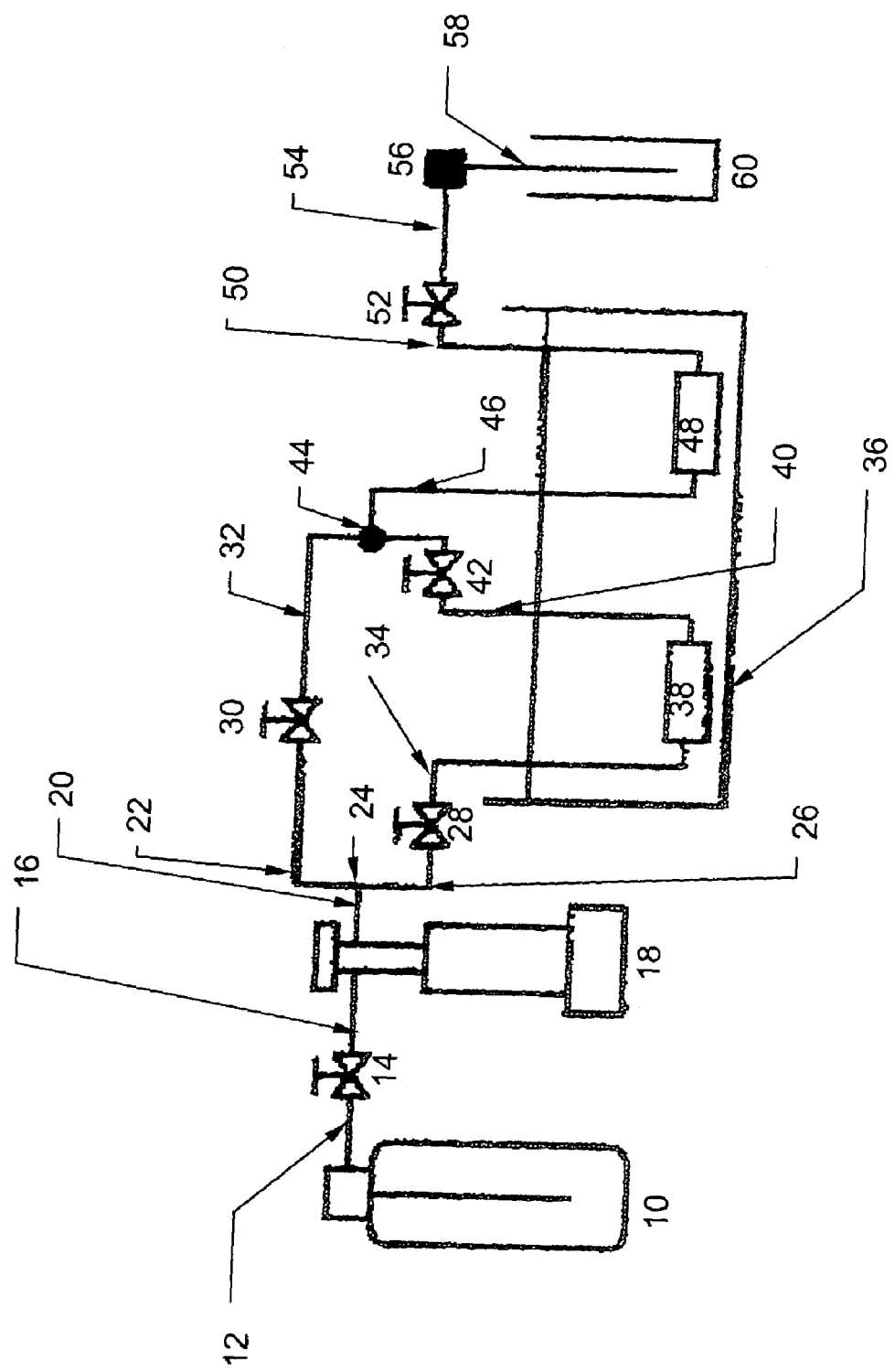
FIG. 1 is a schematic diagram of a system for $UO_2$ dissolution in SF-$CO_2$ where the system contains a $CO_2$ cylinder, syringe pump, ligand cell, sample cell, ultrasound device with a water bath, T-shaped joints, collection vial, and heater for the poly(ether ether ketone) (PEEK) restrictor.

The following definitions are provided solely to aid the reader, and such definitions should not be construed to indicate a term scope less than that understood by a person of ordinary skill in the art.

"Emulsion" or "microemulsion" refers to the high-surface-area, immiscible dispersion of an extractant and/or a fluid-soluble complex in a solvent. More particularly, such a dispersion can result from the anti-solvent effect of the solvent or supercritical solvent for the aqueous Lewis acid or other hydrophilic/polar component associated with the fluid-soluble complex. A microemulsion is a term understood by a person of skill in the art but, without limitation, as used herein typically refers to a two-phase system wherein the droplet diameter is typically less than one micron, and, more often, approximately 100 nm or less.

"Extractant" refers to a material or mixture of materials useful for extracting a metal or metalloid species. It particularly refers to a fluid-soluble complex capable of reacting with, e.g., oxidizing and/or complexing with, the material to be extracted to form another complex containing the material to be extracted and also is $CO_2$-soluble.

"Fluid-soluble complex" refers to the combination of a Lewis acid with a Lewis base to form a complex that is at least partially soluble in $CO_2$, $SF-CO_2$, or another hydrophobic or substantially nonpolar solvent.

"HTTA" refers to 4, 4-trifluoro-1-(2-thienyl)-1, 3-butanedione.

"Lower alkyl" refers to compounds having ten or fewer carbon atoms, and includes both straight-chain and branched-chain compounds and all stereoisomers.

"Supercritical fluid" includes substances at supercritical conditions. Specifically, such fluids may include $SF-CO_2$ and SF-Ar (or any other supercritical noble gas).

"SF-Ar" refers to argon under conditions such that it is a supercritical fluid.

"$SF-CO_2$" refers to carbon dioxide under conditions such that it is a supercritical fluid.

"TBP" refers to tri-n-butylphosphate.

"$TBP/HNO_3/H_2O$" refers to complexes formed from TBP and concentrated $HNO_3$ where the molar ratio of TBP to $HNO_3$ to $H_2O$ may vary.

"Ultrasound," "ultrasonic," and "ultrasonic vibrations" typically refer to vibrations or sound waves primarily of a higher frequency than that which can be detected by the normal human ear. As used herein, the application of "ultrasonic vibrations" or "ultrasound" is the same as "sonication" and these terms are used interchangeably. Such sound waves often include frequencies from about 10,000 Hz to about 500 MHz, typically frequencies from about 20,000 Hz to about 100,000 Hz, and even more typically from about 40,000 Hz to about 50,000 Hz, with many embodiments using an ultrasound frequency of about 45,000 Hz.

The disclosed embodiments of the present method generally involve forming a mixture of an extractant composition or emulsion, particularly aqueous acid extractant compositions, and a supercritical fluid. The extractant compositions may be prepared by complexing a chelating agent with any aqueous Lewis acid, any mineral acid, or any organic acid so long as that acid is capable of reacting with, such as by oxidizing the metal or metalloid to be extracted, or otherwise forming a species that can be extracted into the supercritical fluid phase when the acid contacts the metal or metalloid. The chelating agent is a Lewis base that can combine with the Lewis acid to form an extractant complex that is at least partially soluble in the supercritical fluid because of the high solubility of the chelating agent in the supercritical fluid. Although not bound by any theory expressed herein, contacting the extractant composition with a supercritical fluid is believed to produce an aqueous acid emulsion or microemulsion due to the low solubility of water in the supercritical fluid. The extractant composition is dispersed in the supercritical fluid.

It is believed that the Lewis base is not essential to the method as described in detail herein. The method can be used with any combination of a Lewis acid and a surfactant or other material that can transport the acid in micelles or emulsified droplets in the supercritical fluid phase. In that way, the acid can be dispersed throughout the supercritical fluid phase in very small "droplets" or micelles resulting in a high surface area for dissolution of a metal or metalloid species.

In either case, subjecting the material/supercritical fluid extractant system to ultrasound substantially increases the rate of dissolution of the metal/metalloid. As the data described herein demonstrates, and specifically referring to FIG. 7, the rate of dissolution typically at least doubles with the application of ultrasound. The total amounts of material extracted also are significantly enhanced using ultrasound, typically by at least an order of magnitude above amounts extracted without the application of ultrasound. Thus, applying ultrasonic vibrations to the extractant mixtures, particularly emulsions or microemulsions, provides for rapid and highly efficient dissolution of metals/metalloids.

Sonication significantly improves the dissolution of $UO_2$ in supercritical fluids, such as $SF-CO_2$, using an extractant, such as $TBP/HNO_3/H_2O$ because oxidation and diffusion processes are involved in the dissolution. Without being bound by any theory of operation, it is believed that a significant portion of emulsified extractant droplets are sufficiently small to be substantially uniformly dispersed throughout the supercritical fluid. Moreover, applying ultrasound during dissolution likely facilitates the transport and dispersion of the emulsified droplets throughout the mixture, thereby providing an effectively increased surface area for reaction with the material to be extracted. Ultrasonic vibrations can be applied at many different combinations of frequency, intensity, and amplitude in practicing this method. Sonic vibrations (<10,000 Hz) also may effectively maintain the extractant emulsion described herein.

Contacting a material that includes a metal and/or metalloid species with the acid extractant composition can oxidize the metal and/or metalloid species. The resulting oxidized metal and/or metalloid species complexes with the chelating agent to form an intermediate complex that is highly soluble in the supercritical fluid phase. Alternatively, a metal and/or metalloid species can directly complex with the extractant. In either case, the emulsion droplets provide a high surface area resulting in efficient extraction. The dissolved intermediate complex can be separated from the supercritical fluid by known techniques as described below.

The specific instance of aqueous nitric acid ($HNO_3$) as the Lewis acid, tri-n-butylphosphate (TBP) as the chelating agent, SF-$CO_2$ as the solvent, and uranium dioxide ($UO_2$) as the metal species constitutes one embodiment of the present method. Other embodiments utilize as the Lewis acid any organic or inorganic acid sufficiently strong to react with the species to be extracted; any trialkyl, triaryl, or alkyl-aryl substituted phosphate or phosphine oxide, any substituted phosphinic or phosphonic acid, any β-diketone, any dithiocarbamate, any ionizable crown ether, and mixtures thereof as the Lewis base/chelating agent; any supercritical fluid as a solvent; and any lanthanide, actinide, transition metal, metalloid, platinum group metal or metal species as the extracted material. See Table 1 for specific examples.

The molar ratio of the Lewis acid to the Lewis base may vary, as may the molecular ratio of water in the fluid-soluble complex. The extractant emulsion "droplets" may themselves contain excess unbound Lewis acid or water molecules. However, there are certain advantages in minimizing the water used in the disclosed embodiments, including easing the separation of the metal/metalloid containing complex and minimizing the waste solvent stream of the processes.

A surfactant or mixtures of surfactants may be used to stabilize the extractant emulsion, if required. Illustrative suitable surfactants include sodium bis(2-ethylhexyl) sulfosuccinate ("AOT"), fluorinated AOT, ionic surfactants with fluorinated tails such as perfluoropolyether ("PFPE") tails, and octyl phenol ethoxylate. Examples of surfactants with PFPE tails include PFPE-phosphate (average molecular weight of about 870 g/mol) and PFPE-ammonium carboxylate (average molecular weight of about 740 g/mol).

The resulting metal, metalloid, or metal oxide complex is readily isolated. For example, the system pressure, i.e., the pressure of the supercritical fluid, can be reduced below the critical point, e.g., to approximately atmospheric pressure, and the gas expanded into a collection container. The then gaseous form of the material that was the supercritical fluid may be reused, including recycling it back through the disclosed extraction processes. Any reduction of the pressure of the supercritical fluid below supercritical levels facilitates precipitation of the metal or metal oxide complexes. The metal or metalloid species then can be separated from the Lewis acid/Lewis base complex by any number of known methods, including treatment with concentrated nitric acid.

TABLE 1

Examples of System Components That May Be Used to Extract Metals/Metalloids

| Lewis Acids | Lewis Bases | Solvents (SF" Denotes Supercritical Fluid) | Dissolution species |
|---|---|---|---|
| Inorganic Acids: $HNO_3$, HCl, $H_2O$, $H_2SO_4$, $H_3PO_4$, $HClO_4$, HF | Phosphates: Tri-n-butylphosphate (TBP) Tri-n-octylphosphate Lower alkylphosphates Triphenylphosphate | SF-$CO_2$ $CO_2$ SF-Ar SF-Xe SF-$N_2O$ | Actinides: Th Th (IV) U U (VI) U (IV) |
| Organic Acids: Aryl acids such as benzoic acid, alkyl carboxylic acids such as oxalic acid and citric acid, and other carboxylic acids. | β-diketones: Acetylacetone (AA) Trifluoroacetylacetone (TAA) Hexafluoroacetylacetone (HFA) Thenoyltrifluoroacetone (TTA) Heptafluorobutanoylpivaroylmethane (FOD) 4,4-trifluoro-1-(2-thienyl)-1,3-butanedione (HTTA) | SF-n-pentane SF-n-butane SF-n-propane SF-diethyl ether | Lanthanides La La (III) Eu Eu (III) Lu Lu (III) Nd Nd (III) |
| | Phosphine oxides: Tri-n-butylphosphine oxide Tri-n-octylphosphine oxide (TOPO) Triphenylphosphine oxide (TPPO) | SF-dichlorodifluoromethane SF-Trifluoromethane | Trans Metals: Cu Cu (II) Fe Fe (III) Ni Ni (II) Pd Pd (II) Pt Pt (II) Co Co (III) |
| | Dithiocarbamates: Bis(trifluoroehtyl)dithiocarbamate (FDDC) Diethyldithiocarbamate (DDC) | SF-sulfurhexafluoride | Metals: Bi Bi (III) Hg Hg (II) Zn Zn (II) |

TABLE 1-continued

Examples of System Components That May Be Used to Extract Metals/Metalloids

| Lewis Acids | Lewis Bases | Solvents (SF" Denotes Supercritical Fluid) | Dissolution species |
|---|---|---|---|
| | Crown Ethers: | $SF-H_2O$ | Metalloids |
| | "H-crown" (described in U.S. Pat. No. 5,770,085) | $SF-NH_3$ | As |
| | "F2-crown" (described in U.S. Pat. No. 5,770,085) | SF-isopropanol | As (III) |
| | "F6-crown" (described in U.S. Pat. No. 5,770,085) | SF-ethanol | Sb |
| | | SF-methanol | Sb (III) |
| | Crown Ether Substituted Hydroxamic acid derivatives (described in U.S. Pat. No. 5,770,085) | | |

EXAMPLES

The specific examples described below are for illustrative purposes and should not be considered as limiting the scope of the appended claims.

Example 1

Ultrasound-Enhanced Dissolution of $UO_2$

A particular embodiment of an improved metal dissolution technique is as follows and described in Enokida et al., "Ultrasound-Enhanced Dissolution of $UO_2$ in Supercritical $CO_2$ Containing a $CO_2$-Philic Complexant of Tri-n-butylphosphate and Nitric Acid," *Ind. Eng. Chem. Res.* 2002, 41(9), 2282–2286, which is incorporated herein by reference.

In the system described below, the $TBP/HNO_3/H_2O$ complex probably extracts $UO_2$ by oxidation of U(IV) in solid $UO_2$ to U(VI), forming $UO_2^{2+}$, followed by the formation of $UO_2(NO_3)_2 \cdot 2TBP$ in $SF-CO_2$. $UO_2(NO_3)_2 \cdot 2TBP$ is highly soluble in $SF-CO_2$, exceeding 0.45 mol $L^{-1}$ in $CO_2$ at 313 K and 20 MPa. It is the most soluble metal complex in $SF-CO_2$ reported in the literature thus far.

The supercritical fluid system is illustrated in FIG. 1. As described further below, this system, and that shown in FIG. 5, functioned both as a dynamic extractor and a static extractor. Pressurized $CO_2$ (99.9%, Praxair, San Carlos, Calif.) was introduced from a cylinder 10 to the system via line 12, valve 14, line 16, syringe pump 18 (model 260D with a series D controller ISCO Inc., Lincoln, Nebr.) and line 20 to T-joint 24. Lines 22, 26, 32, 34, 40, 46, 50, 54, 58 and valves 28, 30, 42, 52 were used to control and direct the flow through the remainder of the system. An ultrasonic cleaner, i.e., an ultrasound emitting device, 36 (Fisher Scientific FS30, Pittsburgh, Pa.) with a heater was used as an ultrasound and heat source. Two different stainless steel cells were used, a 6.94-mL cell 38 for the extractant (i.e., $TBP/HNO_3/H_2O$ in $SF-CO_2$) and a 3.74-mL cell 48 for the $UO_2$ dissolution. The volumes were measured gravimetrically using water. A restrictor made of poly(ether ether ketone) (PEEK) 56 with 0.005 in. i.d. was used for sample collection.

Before dynamic extraction, the ligand cell 38 (upstream of the sample cell 48) was kept in a static mode for 10 minutes to allow complete mixing of the $TBP/HNO_3/H_2O$ with $SF-CO_2$ by application of ultrasound at about 25–80 kHz. The sample cell 48, functioning as a supercritical fluid extraction vessel, was pressurized to the same pressure as the ligand cell 38 with $SF-CO_2$ by way of the T-joint 44. The dynamic extraction process was initiated by opening valve 42 separating the two cells, as well as the inlet 28 and outlet 52 valves shown in FIG. 1. Samples were collected in collection vial 60 at 2 minute intervals in chloroform (density=1.472 g $mL^{-1}$) or in n-dodecane (density=0.749 g $mL^{-1}$) during a dynamic extraction of 20 minutes.

The flow rate of the supercritical fluid was between 0.5 and 0.8 mL $min^{-1}$. To increase the surface area of the sample, 5 g of granular glass beads (60–80 mesh; density=2.3 g $mL^{-1}$) were mixed with a certain amount (21 or 7.2 mg) of $UO_2$ (Alfa Division, Danvers, Mass.). The coated beads were placed in dissolution cell 48. For each extraction, 3 mL of a $TBP/HNO_3/H_2O$ complex was used as the extractant.

Back extraction was performed by shaking the collected sample (in 7 mL of chloroform or n-dodecane) with 3 mL of deionized water for 3 minutes, followed by twice washing the organic phase with 3 mL of deionized water. The combined aqueous phase was collected in a 10 mL volumetric flask. The pH of the aqueous solution was measured with a pH meter (Orion model 701A, Cambridge, Mass.), and the uranium content was analyzed spectrophotometrically with Arsenazo-I at a wavelength of 594 nm. Absorption spectra were measured and recorded using a UV-Vis spectrophotometer (Cary 1E, Varian Inc., Palo Alto, Calif.).

The $TBP/HNO_3/H_2O$ extractant was prepared by adding 5 mL of TBP (density=0.979 g $mL^{-1}$) with different volumes of concentrated nitric acid (69.5%; density=1.42 g $mL^{-1}$ or 15.5 mol $L^{-1}$) in a glass tube with a stopper. The mixture was shaken vigorously on a wrist action mechanical shaker for 5 minutes followed by centrifuging for 2 hours. After centrifugation, 3 mL of the TBP-phase was used for the extractions. Table 2 shows the ratios of $TBP/HNO_3/H_2O$ for the three different extractants prepared and used in this system. The concentration of $H_2O$ in the organic phase was measured by Karl-Fischer titration (Aquacounter AQ-7, Hiranuma, Japan) with a 0.1 N NaOH solution after adding a large excess of deionized water.

TABLE 2

Composition of the $TBP/HNO_3/H_2O$ Complex

| Extractant No. | molecular ratio of $TBP:HNO_3:H_2O^a$ | TBP volume,[b] mL | $HNO_3$ volume,[b] mL |
|---|---|---|---|
| 1 | 1:0.7:0.7 | 5 | 0.815 |
| 2 | 1:1.0:0.4 | 5 | 1.30 |
| 3 | 1:1.8:0.6 | 5 | 5.00 |

[a] Based on Karl-Fischer analysis and acid-base titration of the TBP phase.
[b] Initial volume of TBP and 15.5 M nitric acid used for complex preparation.

The solubility of $TBP \cdot (HNO_3)_{1.8} \cdot (H_2O)_{0.6}$ in $SF-CO_2$ was found to be 2.8 mole % at 323 K and 13.7 MPa. The complex TBP.(HNO$_3$)$_{1.8}$.(H$_2$O)$_{0.6}$ is miscible with SF-CO$_2$ at 15 MPa. The other two complexes, TBP.(HNO$_3$)$_1$.(H$_2$O)$_{0.4}$ and TBP.(HNO$_3$)$_{0.7}$.(H$_2$O)$_{0.7}$, are expected to be more soluble, i.e., also miscible, because they contain less HNO$_3$. In addition, the ligand cell 38 was sonicated as described above. Therefore, all of the TBP/HNO$_3$/H$_2$O solution was homogeneously mixed with SF-CO$_2$ in the ligand cell 38 and was expected to remain so as it moved into the sample cell. The average residence time for SF-CO$_2$ entering the sample cell was expected to decrease with a decay constant, 0.091 min$^{-1}$, which is the reciprocal number of the average residence time.

The space available for fluid in the sample cell 48 was calculated to be 1.3 mL based on the known internal volume of the cell and the weight and density of the glass beads. The average residence time for the supercritical fluid was estimated to be about 2 minutes, which is much shorter than that in the ligand cell. Because the collection vial 60 was changed every 2 minutes, the amount of uranium recovered in each collection vial represented the amount of uranium dissolved during the corresponding 2-minute interval of the dynamic extraction process.

Figure 2:
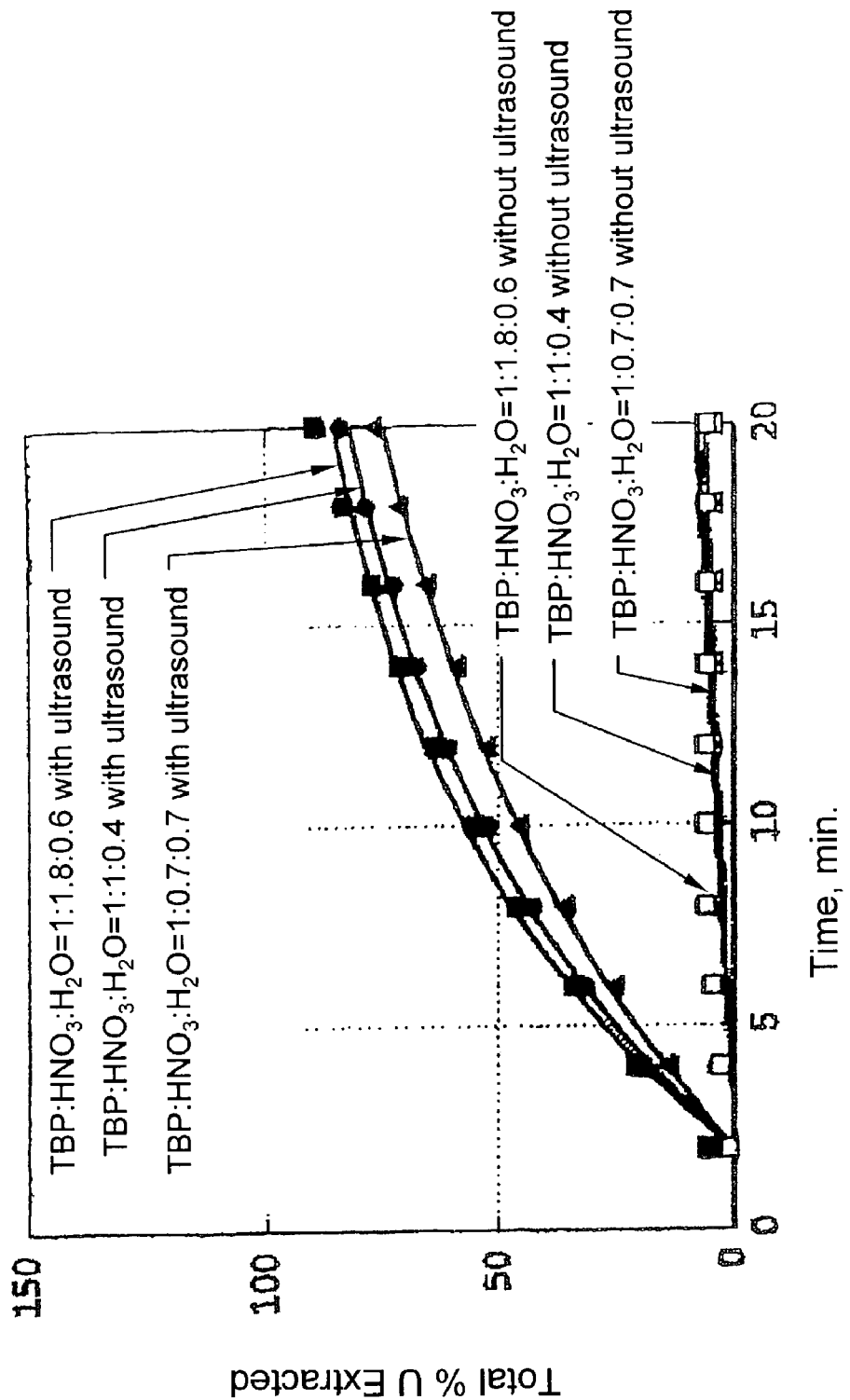
FIG. 2 is a graph of the percent uranium extracted from the sample cell versus time in minutes which contrasts the rate of $UO_2$ dissolution in SF-$CO_2$ containing TBP/$HNO_3$/$H_2O$ at 323 K and 15 MPa with and without the application of ultrasound. The sample initially contained 21 mg of $UO_2$. All fitted curves were obtained by the least-squares method and approached 100% recovery.
Figure 3:
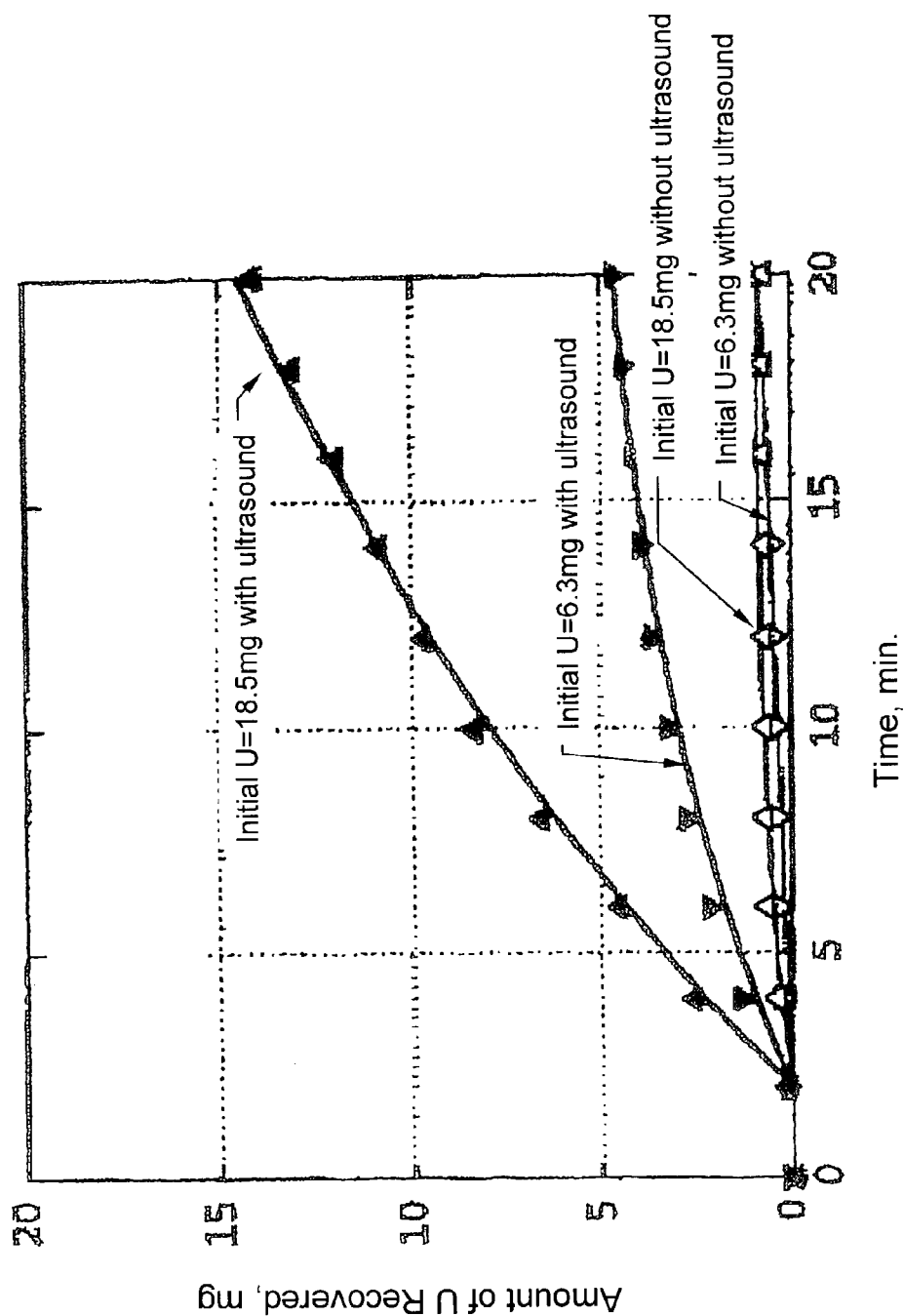
FIG. 3 is a graph of the amount of uranium recovered from the sample cell in milligrams versus time in minutes and illustrates the effect of the initial amount of $UO_2$ on the rate of $UO_2$ dissolution in SF-$CO_2$ containing TBP/$HNO_3$/$H_2O$ at 323 K and 15 MPa with and without the application of ultrasound. All fitted curves were obtained by the least-squares method and approached 100% recovery.

The effect of applying ultrasound during dissolution at 323 K and 15 MPa is illustrated by FIGS. 2–3. For the extractions with 21 mg of UO$_2$ (i.e. 18.5 mg of U), the total amount of U recovered in 20 minutes was small without sonication, e.g., about 0.8 mg for Extractant No. 1 (TBP:HNO$_3$:H$_2$O=1:0.7:0.7), 1.0 mg for Extractant No. 2 (TBP:HNO$_3$:H$_2$O=1:1.0:0.4), and 1.1 mg for Extractant No. 3 (TBP:HNO$_3$:H$_2$O=1:1.8:0.6). There appears to be a small positive correlation between the TBP:HNO$_3$ ratio in the extractant and the dissolution efficiency. After 20 minutes of dynamic extraction, all of the glass beads from the extraction cell 48 were examined and black UO$_2$ powder remained on the surface of the glass beads for runs 1 and 4. For runs 2 and 3, no remaining UO$_2$ powder was observed, and the glass beads were wetted with an organic solution. This organic solution was easily stripped from the glass beads with aqueous nitric acid (1.6 M), and a yellow organic solution containing UO$_2$(NO$_3$)$_2$.2TBP was recovered. Thus, for runs 2 and 3, the UO$_2$ powder was all extracted and converted to UO$_2$(NO$_3$)$_2$.2TBP, but the local concentration of the uranyl complex was probably high enough for most of it to remain on the surface of the glass beads during the dissolution period.

With the application of ultrasound, the amount of uranium recovered from the collection solutions increased significantly. The total amount of uranium recovered after 20 minutes of dynamic extraction was 14.2 mg with Extractant No. 1 (17.75× the amount without sonication), 15.5 mg with Extractant No. 2 (15.5× the amount without sonication), and 16.6 mg with Extractant No. 3 (15.1× the amount without sonication) for the extractions where the initial amount of UO$_2$ was 21 mg. These results represent a recovery of about 77%, 84%, and 90% of the initial UO$_2$ in the SF-CO$_2$ by Extractant Nos. 1–3, respectively. For the extractions starting with 7.2 mg of UO$_2$ (or 6.3 mg of uranium), Extractant No. 1 extracted 4.6 mg of uranium (or 73% of the initial UO$_2$) after 20 minutes of dynamic extraction with the application of ultrasound. This efficiency is slightly lower than when the initial amount of UO$_2$ was 21 mg. In all four cases, the dissolution efficiency was increased by an order of magnitude with the application of ultrasound.

The ultrasound-aided dissolution data can be fit to the equation $$E=100(1-e^{-\lambda t}) \quad (1)$$

where E is the recovery efficiency in % (defined by the ratio of the recovered amount to the initial amount), $\lambda$ is the recovery rate constant in min$^{-1}$, and t is the extraction time in minutes. For all four extractions with the application of ultrasound, the above equation provided a curve with a good fit to the data. The ultrasound-aided dissolution of UO$_2$ with the TBP/HNO$_3$/H$_2$O extractants appears to follow first order kinetics. The recovery rate constants $\lambda$ are 0.077±0.004, 0.096±0.004, and 0.11±0.003 minutes$^{-1}$ for Extractant Nos. 1–3, respectively. According to these $\lambda$ values, there is a positive correlation of the dissolution efficiency with the TBP:HNO$_3$ ratio in the extractant. However, the correlation appears to be small and may be within the limits of experimental error. The ultrasound-aided dissolution rate constants can be converted to the dissolution half-lives from the relationship $t_{1/2}=0.693/\lambda$. The calculated $t_{1/2}$ for Extractant No. 1 is about 9.0 minutes. This means that in a relatively short time (e.g., 5×$t_{1/2}$, is less than 1 hour) about 97% of the UO$_2$ should be extracted under the specified conditions. For Extractant No. 3, extracting about 97% of the initial UO$_2$ would take approximately 32 minutes under the same conditions. These estimates are based on the assumption that the concentration of the TBP/HNO$_3$/H$_2$O extractant in the flowing SF-CO$_2$ stream remains constant. A constant extractant concentration could be easily insured by using a second pump to deliver a constant amount of the extractant to the system. In the above described system, a fixed amount (3 mL) of the extractant was loaded into the ligand cell 38 and, as a result, its concentration in the SF-CO$_2$ stream would be expected to decay over time. Thus, the estimated time to achieve a 97% dissolution efficiency may not be accurate for the system heretofore described. A constant extractant concentration may in fact provide better results.

The following chemical and physical steps are probably involved in this SF-CO$_2$ process; i.e., the extraction of uranium from UO$_2$ powders spiked on the surface of glass beads with an SF-CO$_2$ system: (a) convective and diffusive mass transport of TBP/HNO$_3$/H$_2$O in SF-CO$_2$ to the UO$_2$ powder on the glass surface, (b) dissolution reaction of UO$_2$ with TBP/HNO$_3$/H$_2$O in SF-CO$_2$ and formation of UO$_2$(NO$_3$)$_2$.2TBP near or on the glass surface, and (c) convective and diffusive mass transport of UO$_2$(NO$_3$)$_2$.2TBP in SF-CO$_2$ away from the surface of the glass bead.

The glass beads in the sample cell formed narrow pathways, and convective diffusion was limited compared with a normal bulk space. In porous media, like the pathways defined by the stacked glass beads, the diffusion process is usually dominated by molecular diffusion. The concentration of UO$_2$(NO$_3$)$_2$.2TBP formed near the glass surface is locally very high because of surface interactions. Other porous and/or inert media would have the same effects because of the narrow pathways created. When ultrasound is applied, a fast dissolution rate may result from an increase in the interfacial area between the adhered UO$_2$(NO$_3$)$_2$.2TBP and SF-CO$_2$. Because the application of ultrasound leads to a vigorous agitation near the glass surface and can enlarge the effective diffusivity near the glass surface, the rate of the third step (c) can be markedly enhanced.

If the concentration of TBP/HNO$_3$/H$_2$O is low enough, the first step (a) could be the rate-controlling process. However, the amount of the TBP/HNO$_3$/H$_2$O extractant (3 mL) was in large excess relative to the chemical equivalent amount of uranium in the system (by about 30 times). Therefore, step (a) should not be rate limiting. This theory is supported by the fact that UO$_2$(NO$_3$)$_2$.2TBP was found to cover the surface of the glass beads after extracting without also applying ultrasound. Obviously, the extractant was able to dissolve $UO_2$ without the application of ultrasound, but diffusion of the product $UO_2(NO_3)_2 \cdot 2TBP$ in $SF-CO_2$ was relatively slow because of the narrow spaces between the beads.

The dissolution of $UO_2$ in aqueous nitric acid is known to consist of several steps that can be summarized as follows:

$$UO_2 + 4HNO_3 \rightarrow UO_2(NO_3)_2 + 2NO_2 + 2H_2O \qquad (2)$$

$$2NO_2 + H_2O \rightarrow HNO_3 + HNO_2 \qquad (3)$$

$$UO_2 + 2HNO_2 + 2HNO_3 \rightarrow UO_2(NO_3)_2 + 2NO + 2H_2O \qquad (4)$$

The net reaction can be described as $$UO_2 + \frac{8}{3}HNO_3 \rightarrow UO_2(NO_3)_2 + \frac{2}{3}NO + \frac{4}{3}H_2O \qquad (5)$$

Figure 4:
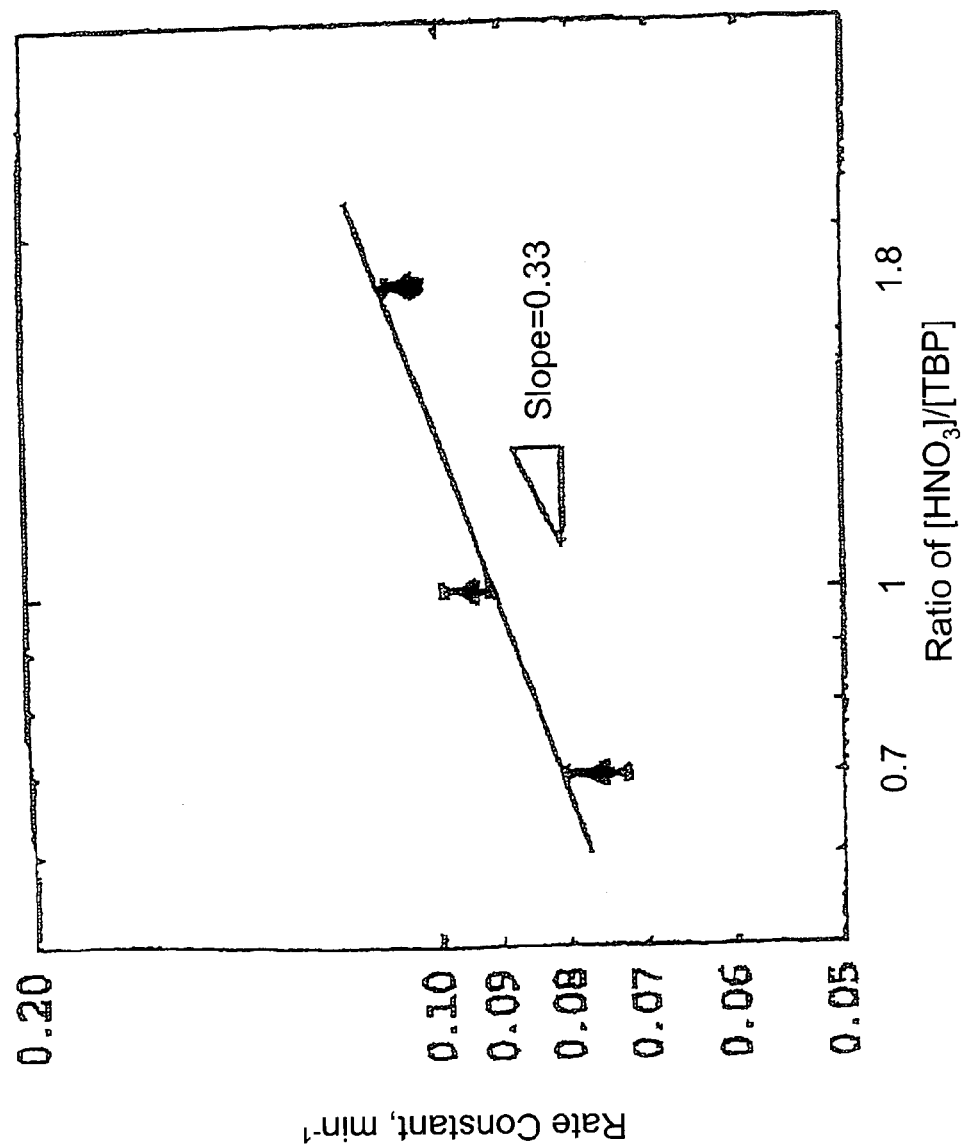
FIG. 4 is a logarithmic plot of rate constants versus the molecular ratio of $HNO_3$ to TBP in the TBP/$HNO_3$/$H_2O$ extractant.

The oxidation of $UO_2$ described in the first step (Eqn. (2)) proceeds by way of electron transfer at the solid-liquid interface. Similar reactions probably also would occur for the dissolution of $UO_2$ in an $SF-CO_2$ system with the $TBP/HNO_3/H_2O$ complex used as an extractant. FIG. 4 shows a line fitted to a logarithmic plot of the empirical rate constants versus the molecular ratio of $HNO_3$ to TBP has a slope of 0.33, which is much smaller than the value of 2.3 reported for the dissolution of $UO_2$ in aqueous nitric acid. This probably can be attributed to the slow mass transfer in the narrow pathways near the surface of the glass beads.

The example of the embodiment described above, provides support for a novel $SF-CO_2$-based process for the direct dissolution of $UO_2$ that may have important applications for reprocessing of spent nuclear fuels and for treatment of nuclear wastes.

Example 2

An Apparatus for Ultrasound Enhanced Dissolution of Uranium Oxides in $SF-CO_2$

In this embodiment, an apparatus (shown in FIG. 5) and method are provided for enhanced dissolution of uranium oxides by the application of ultrasound to an $SF-CO_2$ reaction system containing HTTA.

The uranium oxides included depleted $UO_3$ (Alfa AESAR, Ward Hill, Mass., 99.8%), $UO_2$ (Alfa AESAR, 99.8%), and $U_3O_8$ (NBS Standard Reference Material). The ligands HTTA and TBP also were obtained from Alfa AESAR and used without further purification. SFE-grade carbon dioxide (Air Products, Allentown, Pa.) was used for all extractions. Extracted products were collected in a collection system 144 containing a trap solution (ACS-grade trichloromethane obtained from Fisher, Fairlawn, N.J.) through the restrictors 140 made from 150 mm lengths of deactivated fused silica, 50 μm i.d., purchased from Polymicro Technologies (Phoenix, Ariz.), and a restrictor heater 138. Uranium was back extracted from the trap solutions using 50% nitric acid (Fisher, Fairlawn, N.J.) followed by washing of the organic phase with deionized water produced by a Milli-Q Ultra-pure water system (Millipore Inc).

Figure 5:
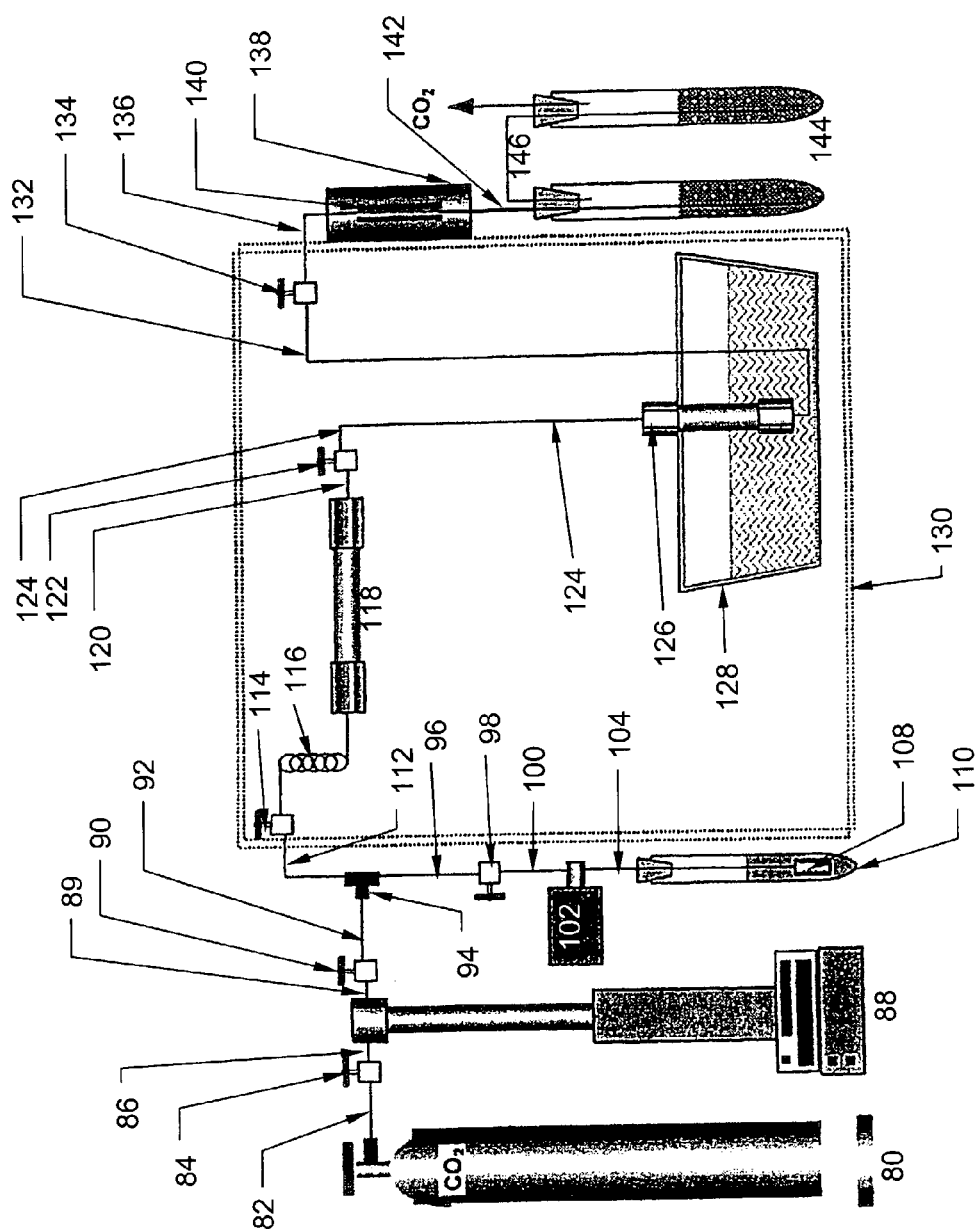
FIG. 5 is a schematic diagram of a system for dissolution of uranium oxides in supercritical carbon dioxide where the system contains $CO_2$ cylinder, syringe pump, oven, HPLC pump, test-tube containing TBP, collection system, restrictor, fluid preheating coil, extraction vessel, ligand cell, restrictor heater, ultrasonic cleaner, T-joint, and filter.

An ISCO model 260D syringe pump 88 (Isco, Inc, Lincoln, Nebr.) with a Series D controller was used to deliver $CO_2$ to the extraction system. The system is illustrated in FIG. 5. Standard 10.4 $cm^3$ and 3.47 $cm^3$ stainless steel HPLC cells (Keystone Scientific Inc., Pa.) were used as ligand 118 and extraction cells 126, respectively. The ligand cell 118 containing HTTA was placed upstream from the extraction cell 126 containing a uranium oxide sample. An oven 130 heated the system to the desired temperature. TBP was injected to the system from test-tube 110 and filter 108 through a T-end joint 94 and volumeless valves used throughout (84, 90, 98, 114, 122, and 134) using an HPLC pump 102, A-30 ks-pk (Eldex Lab Inc., Calif., USA). This system provided a constant TBP concentration of 0.18 mol $dm^{-3}$. The system illustrated in FIG. 5 allowed extractions to be conducted statically, dynamically or by a combination of both methods (static dissolution followed by dynamic dissolution). Flow rates of $CO_2$ from the system were maintained at ~0.4–0.5 $cm^3$ $min^{-1}$ and the flow was directed through lines 82, 86, 89, 92, 96, 100, 104, 112, 120, 124, 132, 136, 142, and 146. With the fluid injected into the system preheated by coil 116, the extractions were carried out at 60° C. and 150 atm. These conditions were previously optimized for the system involved ($UO_3$-TTA-TBP). An ultrasonic cleaner with a heater 128, model FS30 (Fisher Scientific, Pa.), was used to increase the uranium oxide dissolution rate. The extraction cell 126 was placed vertically into the ultrasonic cleaner's tank 128 with water preheated to the required temperature. The ultrasonic cleaner 128 uses transducers mounted to the bottom of its tank to create high frequency sound waves in the tank's liquid. The output frequency of the ultrasonic device was principally in the range 44–48 kHz. Frequencies principally in the range of 20–50 kHz or even 10–100 kHz can also be used with this apparatus and the methods described herein. The collected samples were analyzed for uranium content by the spectrophotometric Arsenazo I method. Absorption spectra were recorded using a Cary 1E UV-Visible recording spectrophotometer.

The solubility of HTTA in $SF-CO_2$ was measured to be $0.041 \pm 0.004_M$ at 60° C. and 150 atm. The $SF-CO_2$ was saturated with HTTA by passing the $SF-CO_2$ through a pre-saturation cell containing an excess of HTTA. The HTTA (mp 42° C.) was maintained in the liquid state in the pre-saturation cell.

Example 3

Dissolution of $UO_3$ in $SF-CO_2$ Using the Apparatus of Example 2

The direct reaction of $UO_3$ with HTTA in large excess efficiently occurred in a static reaction cell system. Although high conversion efficiency to $UO_2(TTA)_2 \cdot H_2O$ was observed, the complex was not efficiently transported from the cell 126 in $SF-CO_2$. Instead the complex remained in the reaction cell as a powdery, orange-colored substance. It was necessary to add TBP to the extraction system to enable transport of the uranium complex. Because TBP is a stronger Lewis base than $H_2O$, it can replace the coordinated $H_2O$ molecule to form the adduct $UO_2(TTA)_2 \cdot TBP$, which is quite soluble in $SF-CO_2$.

Figure 6:
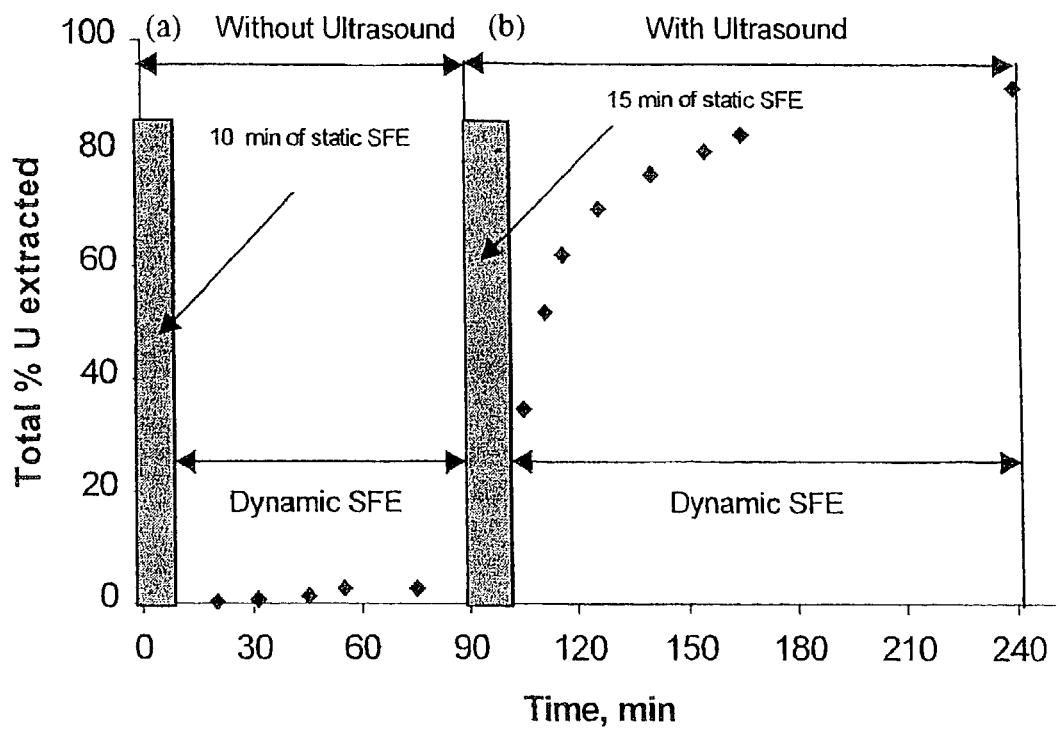
FIG. 6 is a graph of the percent uranium extracted versus time in minutes, illustrating the increased dissolution rate when ultrasound was applied to the system initially containing 18.8 mg of $UO_3$. The reaction conditions were 60° C. and 150 atm using an $SF-CO_2$ stream containing 0.041M HTTA and 0.18M TBP.

The effect of ultrasound application on the dissolution of $UO_3$ in a $SF-CO_2$ stream containing TBP and HTTA is illustrated in FIG. 6. The reaction conditions were 60° C. and 150 atm using an $SF-CO_2$ stream modified with 0.041M HTTA and 0.18M TBP. In the absence of ultrasound the dissolution rate was slow and the efficiency was poor, i.e., the amount of uranium complexed and transported from the extraction cell was small. Even with an initial static dissolution period to allow the $UO_2(TTA)_2 \cdot H_2O$ complex to form, the dissolution rate and efficiency remained poor. With application of ultrasound, the dissolution rate increased significantly. Then the dissolution rate decreased as the HTTA in the extraction system was depleted. The various steps believed to be involved in the dissolution reaction are outlined below:

Mass transport of HTTA and TBP in SF $CO_2$ to $UO_3$ reaction site (6)

$UO_{3(s)} + 2HTTA_{(SF)} \rightarrow UO_2(TTA)_2 \cdot H_2O_{(s)}$ (7)

$UO_2(TTA)_2 \cdot H_2O_{(s)} + TBP_{(SF)} \rightarrow UO_2(TTA)_2 \cdot TBP_{(s)} + H_2O_{(SF)}$ (8)

$UO_2(TTA)_2 \cdot TBP_{(s)} + SF\text{-}CO_2 \rightarrow UO_2(TTA)_2 \cdot TBP_{(SF)}$ (9)

Mass transport of $UO_2(TTA)_2 \cdot TBP_{(SF)}$ in SF-$CO_2$ from extraction cell (10)

Figure 7:
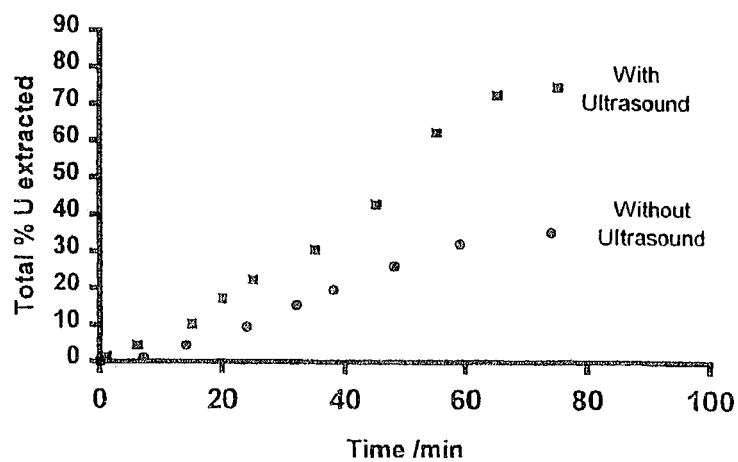
FIG. 7 shows the percent of initial uranium extracted versus time in minutes for dynamic dissolution of $UO_3$ in the presence of a continuous flow of an $HTTA/SF-CO_2$ mixture and contrasts the dissolution rate with the application of versus without the application of ultrasound. Conditions were: T=60° C.; P=150 atm; flow rate=0.5 $cm^3$/min.

The dissolution of $UO_3$ in the presence of a continuous flow of HTTA in SF-$CO_2$ is illustrated in FIG. 7. The dissolution of the oxide and transportation in SF-$CO_2$ are greatly enhanced by the application of ultrasound. Both curves show a slight initiation period, which is characteristic of oxide dissolution in aqueous systems. This initiation period can be defined as the time required for initiating the formation of the uranyl-TTA complex. A region in which the dissolution is linear with time follows this initiation period. Such a linear region potentially indicates a solubility-limited process. However, in unmodified (i.e., pure) SF-$CO_2$ the solubility of $UO_2(TTA)_2 \cdot H_2O$ has been reported as approximately $7 \times 10^{-5}$ M, while the solubility of $UO_2(TTA)_2 \cdot TBP$ in unmodified SF-$CO_2$ is reported to be $4 \times 10^{-3}$ M. Moreover, in the HTTA/TBP-modified SF-$CO_2$, the actual solubility of the complex is expected to be greater than the values reported for the unmodified system. Therefore, the hypothesis that the extraction profile is a solubility-limited profile can be rejected because the solubility of the complex in the SF-$CO_2$ system is much greater than that reflected by the limited actual amounts of uranium transported.

From the above discussion one can conclude that Equation (7) is the rate limiting step, since the extraction requires the presence of HTTA in the extraction system and the amounts of uranium extracted are below the solubility limits of the $UO_2(TTA)_2 \cdot TBP$ in the SF-$CO_2$ system. The rate at which the $UO_2(TTA)_2 \cdot TBP$ complex forms from the $UO_2(TTA)_2 \cdot H_2O$ complex should be fast in this system, since previous work found the displacement of water from the $UO_2(TTA)_2 \cdot H_2O$ complex to be very rapid with a range of Lewis base systems. Accordingly, enhanced dissolution with the application of ultrasound could be attributable to a sort of "cleaning" of the oxide surface by facilitating removal or mass transport of the complex as it is formed and allowing the reaction with HTTA (Equation 7) to take place more efficiently.

Example 4

Dissolution of $UO_2$ and $U_3O_8$ in SF-$CO_2$

The reaction of $UO_2$ and $U_3O_8$ in SF-$CO_2$ under conditions similar to those described above in Example 3 was very slow. Only a small amount of these oxides reacted under similar conditions. This low reaction rate is thought to be due to the stable nature of these particular uranium oxides. Since the higher oxidation state of uranium was found to be very reactive, $H_2O_2$ was added to the system to oxidize the uranium to the $U^{6+}$ state. $H_2O_2$ was added to the system with the extractants and the SF-$CO_2$. Much more uranium was extracted with the addition of an oxidizing agent. Any other peroxide or other agent capable of oxidizing uranium would also increase the dissolution rate for these oxides.

Example 5

Dissolution of $UO_2$ in SF-$CO_2$ Without Applying Ultrasound

In another embodiment, the $CO_2$-philic TBP-$HNO_3$ extractant oxidized $UO_2$ to the hexavalent state leading to the formation of $UO_2(NO_3)_2 \cdot 2TBP$, which is highly soluble in SF-$CO_2$.

TBP is known to form complexes with aqueous $HNO_3$, and the 1:1 and 2:1 (TBP:$HNO_3$ mole ratio) complexes are predominating species when formed with nitric acid solutions of 3 M or less. The TBP-$HNO_3$ complexes also may contain different amounts of water, i.e., have different hydration numbers. In one example, the TBP-$HNO_3$ reagent was prepared by adding 5.0 mL of TBP to 0.82 mL concentrated nitric acid (69.5%, $\rho=1.42$ g cm$^{-3}$) in a glass tube with a stopper. This mixture of TBP and $HNO_3$ (about 1:0.7 mole ratio) was shaken vigorously for 5 minutes followed by centrifugation for 20 minutes. After centrifugation, 3 mL of the TBP phase was removed for supercritical fluid extractions. The density of the TBP phase was measured to be 1.035 g cm$^{-3}$. The remaining aqueous phase was found to have a pH of about 1 after 20 times dilution in water, indicating most of the $HNO_3$ had reacted with TBP to form the TBP-$HNO_3$ complex. Upon addition of the TBP-$HNO_3$ complex to $CDCl_3$, small water droplets formed in the solution indicating the water in the complex would precipitate in an organic solution.

The solubility of this TBP-$HNO_3$ complex in liquid $CO_2$ at room temperature and 80 atm is about 0.38 mL/mL $CO_2$. Referring to FIG. 5, the TBP-$HNO_3$ complex (about 3 mL) was placed in a 10.4 mL stainless steel cell 118 which was connected upstream of a 3.47 mL extraction cell 126 containing about 40–60 mg of uranium oxide. Liquid $CO_2$ was added to the cells using an ISCO model 260D syringe pump 88 and the system was heated in an oven 130 to the desired temperature. Uranium dioxide in a powder form (<0.15 mm diameter) was obtained from Alfa Aesar (Ward Hill, Mass.). Uranium trioxide was also obtained from Alfa Aesar (about 0.15–0.25 mm diameter).

The uranium oxide extractions were performed with supercritical $CO_2$ containing TBP-$HNO_3$ flowing through the system at a rate of 0.4 mL min$^{-1}$ measured at the pump 88. The dissolved uranium complex was collected in chloroform in collector 144, followed by back extraction with 8M $HNO_3$ and twice washing the organic phase with deionized water. The combined acid-water solution was analyzed for uranium spectrophotometrically and by ICP-AES. UV-VIS spectroscopy showed that the trapped uranium complex had an identical absorption spectrum to that previously reported in the literature for $UO_2(NO_3)_2 \cdot 2TBP$. See M. J. Carrott, B. E. Waller, N. G. Smart and C. M. Wai, *Chem Commun.*, 1998, 373.

The amount of the TBP-$HNO_3$ extractant dissolved in the $CO_2$ phase during the dynamic extraction process was determined by measuring the change in volume of the extractant in the 10.4 ml cell over the course of the extraction. The amount of the TBP-$HNO_3$ extractant in the supercritical $CO_2$ stream was determined to be about 0.08 mL/mL of $CO_2$ at 60° C. and 150 atm. Measured by molecular equivalents, an excess of the TBP-$HNO_3$ extractant with respect to $UO_2$ was used in the dynamic extractions.

Direct dissolution of $UO_2$ in supercritical $CO_2$ under the specified conditions apparently occurred rapidly. However, dissolution of $UO_3$ in supercritical $CO_2$ under the same conditions was even more effective. This may be explained by the fact that $UO_3$ is in the hexavalent oxidation state and is thereby ready to form the $CO_2$-soluble $UO_2(NO_3)_2 \cdot 2TBP$ complex. The dissolution of $UO_2$ may be represented by Equation (11) assuming the $TBP-HNO_3$ complex has a 1:1 stoichiometry:

$$UO_2(solid) + 8/3 TBP-HNO_3 \rightarrow UO_2(NO_3)_2 2TBP + 2/3 NO + 4/3 H_2O + 2/3 TBP \quad (11)$$

Similar equations of different stoichiometry can be written for the 2:1 and other $TBP-HNO_3$ complexes.

Dissolution of $UO_2$ in liquid $CO_2$ was slow relative to that observed in the supercritical $CO_2$ extractions. Because oxidation of $UO_2$ is required for the dissolution process, the slower diffusion of the oxidized products in the liquid phase could be a factor limiting the dissolution rate. The diffusion coefficient of supercritical $CO_2$ is typically an order of magnitude higher than that of the liquid. Under the same liquid $CO_2$ conditions, dissolution of $UO_3$ was about the same as that in the supercritical phase, perhaps because oxidation was not required.

The density of supercritical $CO_2$ influences the solvation strength and hence solubility of solutes in supercritical fluid phases. The dissolution of $UO_2$ in supercritical $CO_2$ increased rapidly with the density of the fluid phase. After twelve minutes of dynamic extraction, the amount of $UO_2$ extracted into the supercritical $CO_2$ phase at density 0.7662 g cm$^{-3}$ was about an order of magnitude higher than that at density 0.6125 g cm$^{-3}$. The density effect could be due in part to the increased amount of the $TBP-HNO_3$ complex in the supercritical $CO_2$ stream related to the increase in density of the fluid phase. This strong dependence of $UO_2$ dissolution on supercritical $CO_2$ density may be used as a parameter allowing for selective dissolution and separation of $UO_2$ from materials containing other species. These results suggest the possibility of dissolving/extracting spent nuclear fuels in supercritical $CO_2$ without using conventional acid and organic solvents.

Example 6

Removal of $UO_2$ and $U_3O_8$ From a Sea Sand Mixture

Another embodiment is directed to decontaminating uranium from solid wastes containing uranium oxides, $UO_2$ or $U_3O_8$, using SF-$CO_2$ containing an $HNO_3$-TBP complex. This embodiment is effective with or without the application of ultrasound. It is likely that (1) the H$^+$ supplied by the $HNO_3$-TBP complex dissociates the U-O bond, (2) NO$^-_3$ in the complex plays a role both as an oxidant to convert U(IV) to U(VI) and as the counter anion to neutralize the uranium ion, and (3) TBP acts as a complex forming agent to form the hydrophobic complex, i.e., $UO_2(NO_3)_2(TBP)_2$, which is soluble in the SF-$CO_2$ phase. In this example uranium is selectively dissolved/extracted into supercritical $CO_2$, forming the complex $UO_2(NO_3)_2(TBP)_2$.

The $HNO_3$-TBP complex was prepared by vigorously mixing 100 cm$^3$ of 70% $HNO_3$ (Wako Pure Chemicals Co.) with 100 cm$^3$ of TBP (Koso Chemical Co.) in a conventional extraction tube for 30 minutes. The $HNO_3$-TBP complex thus obtained was determined to contain $HNO_3$ and TBP in a molar ratio of 4.5:3 and be a mixture of $(HNO_3)_2(TBP)$ and $HNO_3(TBP)$ complexes.

A synthetic solid waste sample was prepared, consisting of a mixture of ca. 100 mg of $UO_2$ or $U_3O_8$ powder and 50 g of standard sea sand (Wako, 20–30 mesh). The $UO_2$ powder was obtained by mechanically grinding a $UO_2$ nuclear fuel pellet and the $U_3O_8$ was prepared by heating the $UO_2$ powder in air for 2 hours at 480° C.

The sample was placed in a reaction vessel. The $CO_2$ fluid was introduced to the vessel using a syringe pump. After the pressure reached 20 MPa, the stopcock at the outlet of the reaction vessel was opened and $CO_2$ was allowed to flow through the vessel at a rate of 3.5 cm$^3$/min while keeping the pressure at 20 MPa. The $HNO_3$-TBP complex was mixed into the $CO_2$ stream using a plunger pump to continuously inject the complex at a rate of 0.3 cm$^3$/min. The mixture of the $HNO_3$-TBP complex and $CO_2$ was allowed to flow through the system for 20 minutes (for a dynamic dissolution). The total volume of the mixture flowing through the vessel in this dynamic dissolution step was approximately 2.5× the dead space of the reaction vessel (ca. 30 cm$^3$). Then, both stopcocks at the inlet and the outlet of the reaction vessel were closed and the system was allowed to stand for 60–90 minutes (for a static dissolution). Carbon dioxide was allowed to flow through the vessel at 3.5 cm$^3$/min for 60 minutes after the static dissolution. The $CO_2$ flow eluted from the reaction vessel was collected through a restrictor. The dissolved species, i.e., $UO_2(NO3)_2(TBP)_2$ complex, was collected in the collection vessel at ambient pressure and the $CO_2$ allowed to gasify. Dynamic dissolution and static dissolution procedures were repeated twice. As detailed above in Example 1, the sand sample was washed with concentrated nitric acid and the concentration of uranium in the washing solution was analyzed by an ICP-AES (Shimadzu, ICPS-8000E).

The $UO_2$ or $U_3O_8$ remaining on the treated sand sample was 0.3 mg (decontamination factor DF=350) or 0.01 mg (DF=10,000), respectively. Most of the uranium (95–99%) was recovered from the collection vessel. Uranium(VI) was quantitatively stripped as U(VI)-carbonate from the $UO_2(NO_3)_2(TBP)_2$ using an aqueous solution of $(NH_4)_2CO_3$ allowing the recovered TBP to be reused.

Having illustrated and described the principles of the disclosed method and system with reference to several embodiments, it should be apparent to those of ordinary skill in the art that the method and system may be modified in arrangement and detail without departing from such principles. None of the examples or descriptions herein should be construed as limiting the scope of the present invention, which should instead be construed as having a scope commensurate with the following claims.

We claim:

1. A method for extracting at least one metal or metalloid species from a material using a supercritical fluid, comprising:
    forming a mixture comprising a supercritical fluid, an extractant and a metal or metalloid species; and
    subjecting the mixture to ultrasonic vibrations to extract the metal or metalloid species from the material.

2. The method according to claim 1 wherein the ultrasonic vibrations are within the range of from about 10 kHz to about 100 kHz.

3. The method according to claim 2 wherein the ultrasonic vibrations are greater than 20 kHz.

4. The method according to claim 1 wherein the ultrasonic vibrations are within the range of from about 40 kHz to about 50 kHz.

5. The method according to claim 4 wherein subjecting the mixture to ultrasonic vibrations is performed at a temperature of from about 300 K to about 350 K and a pressure of from about 10 MPa to about 25 MPa.

6. The method according to claim 1 wherein the supercritical fluid is selected from the group consisting of argon, carbon dioxide, xenon, nitrous oxide, pentane, butane, propane, diethyl ether, dicholorodifluoromethane, trifluoromethane, sulfur hexafluoride, water, ammonia, isopropanol, ethanol, methanol, and combinations thereof.

7. The method according to claim 6 where the metal or metalloid species is selected from the group consisting of thallium, lanthanum, europium, lutetium, neodymium, copper, iron, nickel, cobalt, bismuth, mercury, zinc, arsenic, antimony, uranium, platinum, and palladium in either metallic form or a positive oxidation state.

8. The method according to claim 1 where the extractant comprises an inorganic acid.

9. The method according to claim 1 where the extractant comprises an organic acid.

10. The method according to claim 1 where the extractant comprises a Lewis acid selected from the group consisting of nitric acid, hydrochloric acid, sulfuric acid, phosphoric acid, perchloric acid, hydrofluoric acid, 4,4-trifluoro-1-(2-thienyl) -1,3-butanedione, and combinations thereof.

11. The method according to claim 1 wherein the extractant comprises an agent selected from the group consisting of tri-n-butylphosphate, tri-n-octylphosphate, triphenylphosphate, acetylacetone, trifluoroacetylacetone, hexafluoroacetylacetone, thenoyltrifluoroacetone, 4, 4-trifluoro-1-(2-thienyl)-1, 3-butanedione heptafluorobutanoylpivaroylmethane, water, tri-n-butylphosphine oxide, tri-n-octylphosphine oxide, triphenylphosphine oxide, bis(trifluoroethyl)dithiocarbamate, diethyldithiocarbamate, crown ethers, crown ether substituted hydroxamic acid derivatives, and combinations thereof.

12. The method according to claim 1 where the mixture is a microemulsion.

13. The method according to claim 1 where subjecting the mixture to ultrasonic vibrations is performed at a temperature of from about 300 K to about 350 K and at a pressure of from about 10 MPa to about 25 MPa.

14. The method according to claim 1 where the metal species comprises uranium, platinum, or palladium in either a ground oxidation state or a positive oxidation state.

15. The method according to claim 1 where at least 70 % of the metal or metalloid species is extracted from the material.

16. The method according to claim 1 further comprising changing an oxidation state of the metal or metalloid species.

17. The method according to claim 1 further comprising using an oxidizing agent to change the oxidation state of the metal or metalliod species.

18. The method according to claim 17 where the oxidizing agent is hydrogen peroxide.

19. The method according to claim 1 wherein the mixture is subjected to ultrasonic vibrations in a supercritical fluid extraction vessel and the supercritical fluid extraction vessel contains an inert material.

20. The method according to claim 19 where the inert material is or defines a porous medium.

21. The method according to claim 20 where the porous medium comprises packed beads.

22. The method according to claim 1 where extraction of the metal or metalloid species has a rate constant and the rate constant is at least doubled by subjecting the mixture to ultrasonic vibrations relative to not subjecting the mixture to ultrasonic vibrations.

23. The method according to claim 1 wherein an amount of the metal or metalloid species extracted by subjecting the mixture to ultrasonic vibrations is at least double the amount of the metal or metalloid species extracted without subjecting the mixture to ultrasonic vibrations.

24. The method according to claim 1 wherein the supercritical fluid has a density and the method further comprises changing the density of the supercritical fluid to enhance the extraction efficiency or selectivity for a particular metal or metalloid species.

25. The method according to claim 1 and further comprising selecting a supercritical fluid to have a particular density range under the supercritical conditions applied to enhance extraction efficiency or selectivity.

26. The method according to claim 1 wherein the extractant comprises a lower alkyl phosphate.

27. An ultrasound method for extracting at least one metal or metalloid species from a material using a supercritical fluid, comprising:
    forming a mixture comprising a supercritical fluid, a metal or metalloid species, a chelating agent, and a Lewis acid;
    inducing or maintaining supercritical conditions at a temperature range of from about 300 K to about 350 K and a pressure of from about 10 MPa to about 25 MPa; and
    applying ultrasonic vibrations in the frequency range from about 20 kHz to about 50 kHz to the mixture.

28. The method according to claim 27 wherein the supercritical fluid has a density and the method further comprises changing the density of the supercritical fluid to enhance the extraction efficiency or selectivity for a particular metal or metalloid species.

29. The method according to claim 27 where the supercritical fluid is selected from the group consisting of argon, carbon dioxide, xenon, and combinations thereof.

30. The method according to claim 27 where the metal or metalloid species is selected from the group consisting of uranium, platinum, palladium and combinations thereof.

31. The method according to claim 27 where the Lewis acid is an inorganic acid.

32. The method according to claim 31 where the inorganic acid is selected from the group consisting of nitric acid, hydrochloric acid, sulfuric acid, and combinations thereof.

33. The method according to claim 27 where the chelating agent is selected from the group consisting of tri-n-butylphosphate, tri-n-octylphosphate, 4, 4-trifluoro-1-(2-thienyl)-1, 3-butanedione, and combinations thereof.

34. The method according to claim 27 wherein at least 90% of the metal or metalloid species is extracted.

35. The method according to claim 27 further comprising using an oxidizing agent to change an oxidation state of the metal or metalliod species.

36. The method according to claim 35 where the oxidizing agent is hydrogen peroxide.

37. An ultrasound method for extracting at least one metal or metalloid species from a material using a supercritical fluid, comprising:
    forming a mixture comprising supercritical carbon dioxide, a metal or metalloid species selected from the group consisting of uranium, platinum, palladium and combinations thereof, a chelating agent selected from the group consisting of tri-n-butylphosphate, tri-n-octylphosphate, 4, 4-trifluoro-1-(2-thienyl)-1, 3-butanedione, and combinations thereof, and a Lewis acid;
    inducing or maintaining supercritical conditions of the mixture at a temperature range of from about 300 K to about 350 K and a pressure of from about 10 MPa to about 25 MPa; and
    subjecting the mixture to ultrasonic vibrations in the frequency range from about 20 kHz to about 50 kHz to the mixture.

38. The method according to claim 37 where the supercritical carbon dioxide has a density and the method further comprises changing the density of the supercritical carbon dioxide to enhance the extraction efficiency or selectivity for a particular metal or metalloid species.

39. The method according to claim 37 where the supercritical carbon dioxide has a range of densities and a density within the range of densities is selected to enhance extraction efficiency or selectivity.

* * * * *